UNITED STATES PATENT OFFICE.

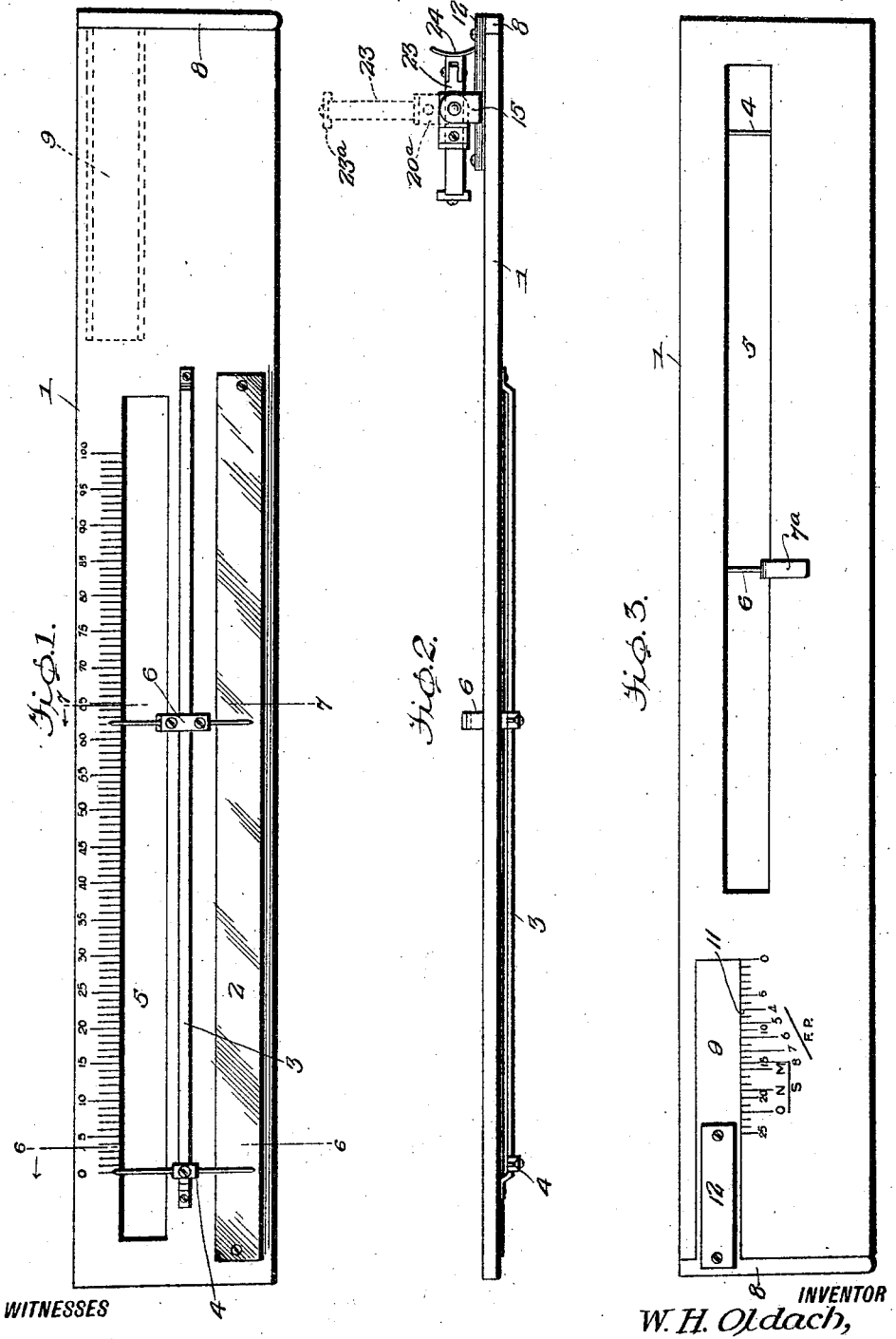

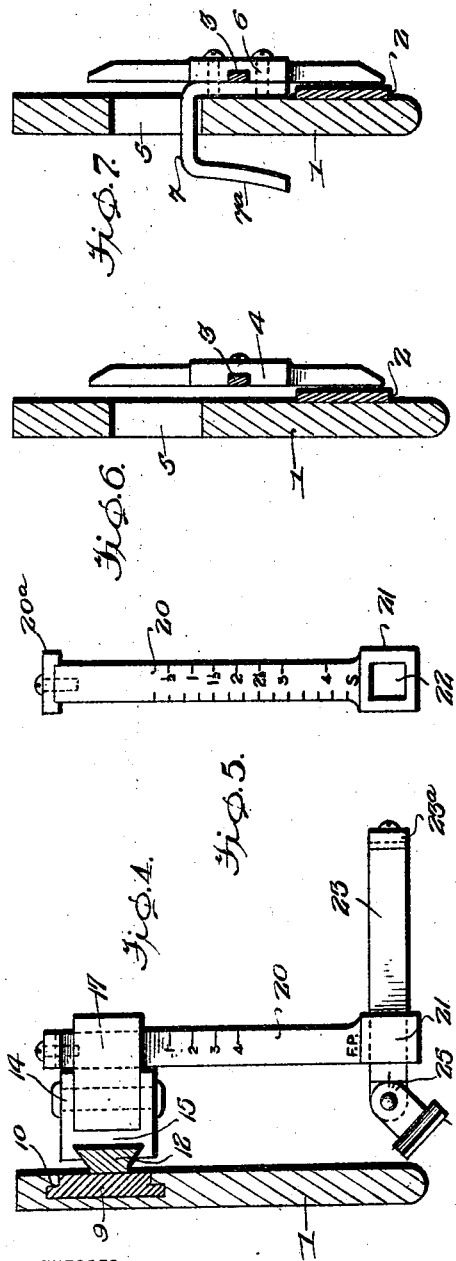

WILLIAM HOWARD OLDACH, OF PANAMA, PANAMA.

PRECISION INTERPUPILLARY AND BRIDGE MEASURE.

1,413,606.  Specification of Letters Patent.  Patented Apr. 25, 1922.

Application filed September 20, 1920. Serial No. 411,472.

*To all whom it may concern:*

Be it known that I, WILLIAM HOWARD OLDACH, a citizen of the United States, and a resident of Panama, in the Republic of Panama, have invented certain new and useful Improvements in Precision Interpupillary and Bridge Measures, of which the following is a specification.

My invention relates to optician's gages and has reference more particularly to interpupillary and bridge measures the principal object being to produce an optical gage in rule form in which an interpupillary measure and a bridge measure are combined in rule form.

In the measurements for the fitting of frames for nose glasses or for spectacles it is necessary to determine accurately the pupillary distance, or the distance between the pupils of the eyes, and the bridge measurements.

Means have been devised to determine these various measurements, but these means have been usually of such construction as to permit only a limited number of the various measurements, or they comprise a cumbersome metal apparatus with numerous adjusting and complicated parts.

It is for the purpose of overcoming these difficulties and permitting wide range in measurements and at the same time securing accuracy that I have devised the present invention.

My invention, therefore, with the hereinbefore stated object, and others in view, consists in certain novel features of construction and arrangement of parts as will be hereinafter described and pointed out in the claims, reference being had to the accompanying drawings in which, Figure 1 is a front view of my improvement, Figure 2 is a top edge view of same, Figure 3 is a rear view, Figure 4 is a vertical section showing vertical and horizontal posts and mountings, Figure 5 is a view in elevation of the vertical post.

Figure 6 is an enlarged vertical section taken on line 6—6 of Fig. 1,

Figure 7 is a similar view on line 7—7 of Figure 1,

Figure 8 is an enlarged horizontal detail section showing caliper and post mounts, Figure 9 is a perspective view of the bracket slide, bracket and post block disassembled.

As shown in the various figures my rule consists of a graduated steel straight edge 1 having applied to its front face adjacent its lower edge, a mirror 2 which is of polished steel and secured to the straight edge by small screws as shown, or the reflecting area may be the highly polished face of the straight edge.

Above the reflector a flat slide bar 3 is provided the ends thereof being screwed to the rule and between the ends the bar being set off from the front face of the rule. Upon this bar adjacent the left end is placed a pointer 4, which is fixed and rigidly secured to the bar 3 by a top screw.

Above the slide bar the rule is provided with an elongated slot 5 which is approximately of the same extent as the mirror, the upper edge of the slot being graduated as shown.

A movable pointer 6 is also mounted on the bar 3 being fitted to slide on said bar and being held to the same by a bent clip 7 one end of which extends through the slot 5, and the other end being secured to the back of the pointer 6 and against the slide bar by screws passing through the body of the pointer and into said end of the finger piece 7ª.

The lower edge of the rule is rounded, and at the right hand end of the rule a T head 8 is placed said head being of the same thickness as the rule and also having its lower edge rounded laterally and longitudinally.

This head is connected to the rule by a dove-tailed or under cut caliper 9 which slides in an under-cut or dove-tailed recess 10 in the rear face of the rule and extending from its right end inwardly a suitable distance to completely house the slide stem and permit the head to fit closely against the right end of the rule. One edge of this recess or groove is provided with the necessary graduations 11 which represent standard and finger piece measurements in millimeters.

Secured to the outer face of this caliper or stem 9 or made integral therewith if preferred, is an under cut rib or guide 12 upon which is fitted to slide horizontally a bracket, comprising upper and lower perforated jaws or ears 14 and a vertical connecting bar 15 having an under cut groove 16 which has a sliding fit on the under cut rib or guide 12.

Between the jaws of the bracket is hinged a block 17 having one rear corner rounded off as at 18 the free end of the said block having a rectangular aperture 19 there through in which is slidably mounted a vertical post 20 with graduations thereon. The lower end of this post carries a sleeve 21 having a rectangular aperture 22 therethrough in which slides a horizontal post 23, at one end of which is hinged a bridge pad 24 operating on a graduated quadrant 25, the horizontal post being graduated to register lateral position of bridge crests in standard spectacles and finger piece bridge depths, and same in millimeters, the nose pad operating on quadrant graduated to register angle of crest.

The vertical post and horizontal post are provided at their free ends with the overhanging caps 20ᵃ and 23ᵃ respectively.

The manner of using the device for interpupillary measurement is as follows:—

Interpupillary measurement is made by directing the subject's vision through the slot or aperture 5 in the instrument, at a fixed object; the rule is then held so that the eye nearest the fixed indicator or pointer 4 is bisected by same, observer's position being so that reflection in mirror of observing eye is also bisected by pointer, and the movable pointer or indicator is adjusted so that relation of other eye to observer's eye is the same, reading being taken from the position of movable pointer or indicator.

To take bridge measurement, instrument is reversed and sliding end 8 drawn out making an aperture or space sufficiently wide to saddle bridge of nose, tightly if finger piece of eye glass measurement is desired, loosely if regular spectacle bridge measurement is desired; then with lower edge of rule bisecting pupils of eye laterally adjustment of bridge pad on sliding vertical and horizontal posts is made, base of bridge being read from instrument caliper or slide, height from vertical post, and angle of crest from quadrant on bridge pad. The inside plane of rule will be plane of lens.

I claim:—

1. In a device as herein characterized, a graduated rule having an elongated slot therethrough an elongated reflecting area on one face of said rule extending in the direction of the length of said slot, a fixed pointer extending transversely across said slot adjacent one end thereof, and second pointer or indicator slidably mounted on said rule between said fixed pointer and the other end of the slot, said slidable pointer also extending transversely across said slot.

2. An instrument for the purposes specified, comprising a graduated steel straight edge, having an aperture through which the pupils of the eyes may be observed, a reflecting area for reflecting the image of the observer's eyes, a fixed indicator for registering the position of one eye, and a movable indicator for registering the position of the other eye.

3. As a new article of manufacture a graduated rule having an elongated sight aperture therethrough a mirror disposed below the lower edge of said aperture, the length of said mirror approximately the same as that of the aperture, and a fixed and a sliding indicator extending across said aperture.

WILLIAM HOWARD OLDACH.